United States Patent
Kumble et al.

(10) Patent No.: US 11,687,416 B2
(45) Date of Patent: Jun. 27, 2023

(54) DATA BACKUP OPTIMIZATION

(71) Applicant: KYNDRYL, INC., New York, NY (US)

(72) Inventors: Ramesh Kumble, Ashburn, VA (US); Pramod Belsare, Pune (IN); Satish Lodam, Pune (IN)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 17/486,885

(22) Filed: Sep. 27, 2021

(65) Prior Publication Data
US 2023/0097507 A1    Mar. 30, 2023

(51) Int. Cl.
*G06F 11/00*    (2006.01)
*G06F 11/14*    (2006.01)

(52) U.S. Cl.
CPC ...... *G06F 11/1464* (2013.01); *G06F 11/1435* (2013.01); *G06F 11/1451* (2013.01); *G06F 11/1453* (2013.01); *G06F 11/1469* (2013.01)

(58) Field of Classification Search
CPC ............. G06F 11/1464; G06F 11/1435; G06F 11/1451; G06F 11/1469; G06F 11/0727; G06F 11/1458; G06F 11/1448; G06F 11/1453
See application file for complete search history.

(56) References Cited

U.S. PATENT DOCUMENTS

| | | | |
|---|---|---|---|
| 7,634,657 B1 * | 12/2009 | Stringham | H04L 9/0643 713/168 |
| 7,913,047 B2 | 3/2011 | Erickson et al. | |
| 9,679,040 B1 * | 6/2017 | Davis | G06F 11/1435 |
| 10,126,972 B1 * | 11/2018 | Healey | G06F 11/1453 |
| 2011/0307657 A1 | 12/2011 | Timashev et al. | |
| 2012/0233417 A1 | 9/2012 | Kalach et al. | |
| 2013/0173553 A1 | 7/2013 | Apte et al. | |
| 2013/0232126 A1 | 9/2013 | Jain et al. | |
| 2013/0339319 A1 * | 12/2013 | Woodward | G06F 11/1451 707/692 |
| 2014/0351214 A1 | 11/2014 | Abercrombie et al. | |
| 2017/0286233 A1 * | 10/2017 | Dain | G06F 11/1453 |
| 2017/0286443 A1 | 10/2017 | Ram | |

OTHER PUBLICATIONS

"Commvault Distributed Storage technical and architectural overview whitepaper," [online] © 2021 Commvault, retrieved from the Internet: <https://www.commvault.com/resources/commvault-distributed-storage-platform-technical-and-architectural-overview-whitepaper>, Jun. 10, 2021, 33 pg.

Mell, P. et al., The NIST Definition of Cloud Computing, National Institute of Standards and Technology, U.S Dept of Commerce, Special Publication 800-145, Sep. 2011, 7 pg.

* cited by examiner

*Primary Examiner* — Joseph D Manoskey

(74) *Attorney, Agent, or Firm* — Van Leeuwen & Van Leeuwen; Daniel C. Housley

(57) ABSTRACT

At least one data file for backup can be received. The data file can be divided into a plurality of data blocks. A first portion of the plurality of data blocks can be allocated to a first data processing system for backup by the first data processing system. A second portion of the plurality of data blocks can be allocated to a second data processing system for backup by the second data processing system.

15 Claims, 11 Drawing Sheets

DATA BACKUP OPTIMIZATION

BACKGROUND

The present invention relates to cloud computing, and more specifically, to data backup in a cloud computing environment.

The purpose of data backup is to create a copy of data that can be recovered in the event of primary data failure. Primary data failures can result from hardware failures, software failures, data corruption, or human-caused events, such as malicious attacks or accidental deletions of data. As the use of computing devices continues to grow throughout the world, so too does the amount of data that is backed up.

SUMMARY

A method includes receiving at least one data file for backup. The method also can include dividing, using a processor, the data file into a plurality of data blocks. The method also can include allocating a first portion of the plurality of data blocks to a first data processing system for backup by the first data processing system. The method also can include allocating a second portion of the plurality of data blocks to a second data processing system for backup by the second data processing system.

A system includes a processor programmed to initiate executable operations. The executable operations include receiving at least one data file for backup. The executable operations also can include dividing the data file into a plurality of data blocks. The executable operations also can include allocating a first portion of the plurality of data blocks to a first data processing system for backup by the first data processing system. The executable operations also can include allocating a second portion of the plurality of data blocks to a second data processing system for backup by the second data processing system.

A computer program product includes a computer readable storage medium having program code stored thereon. The program code is executable by a data processing system to initiate operations. The operations include receiving at least one data file for backup. The operations also can include dividing the data file into a plurality of data blocks. The operations also can include allocating a first portion of the plurality of data blocks to a first data processing system for backup by the first data processing system. The operations also can include allocating a second portion of the plurality of data blocks to a second data processing system for backup by the second data processing system.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
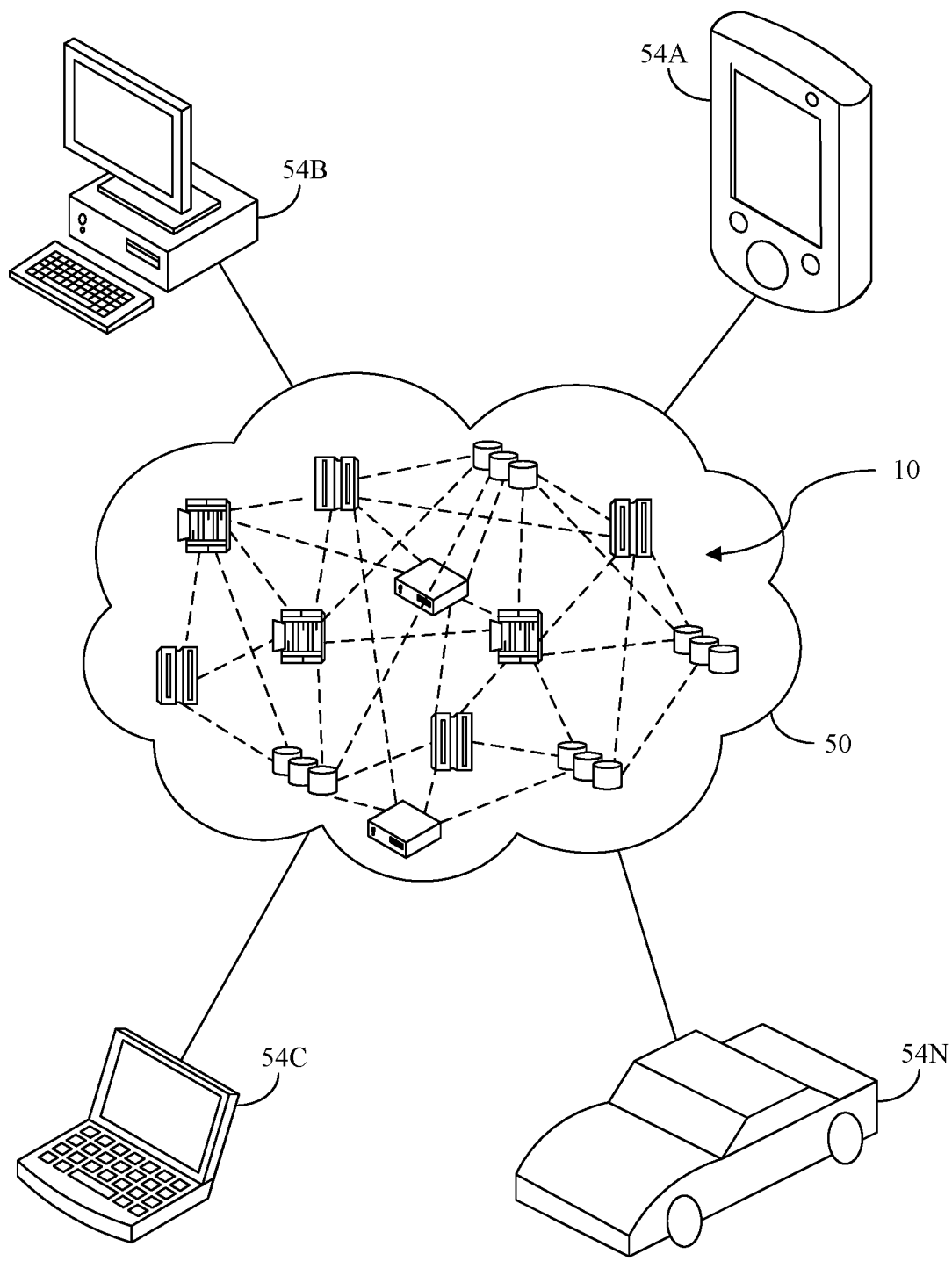
FIG. 1 depicts a cloud computing environment according to an embodiment of the present invention.

The arrangements described herein are directed to computer technology, and provide an improvement to computer technology.

Specifically, the present arrangements improve data backup systems by reducing data duplication across data backups for multiple systems, thus reducing the amount of data stored to create data backups. Specifically, data files can be divided into data blocks. Each data block can be compared to data blocks that already are stored to determine if a matching data block already is stored. Only those data blocks, for which a matching data block is not already stored, need be stored. In this regard, a plurality of backup customers each may be using the same operating system, the same application, etc. If that software already is backed up, the entirety of the software need not again be backed up. Instead, only the data blocks that differ from existing data blocks are backed up. Accordingly, the present arrangements reduce the amount of storage capacity necessary to store the data backups for a plurality of different systems/devices. The data blocks can be relatively small in size, for example, 1 kB, 2 kB, 4 kB, 6 kB, 8 kB, etc. Accordingly, duplication of data stored in data storage locations (e.g., a data storage vault) can be mitigated at a very granular level.

Further, the present arrangements improve the efficiency at performing the data backups by reducing processor loads during the backup process. Specifically, during the process of determining whether a particular data block has a matching data block that already is stored, a hash value can be computed for the data block and compared to hash values of stored data blocks. Each block that has be stored in the data repository can be assigned to plurality of data processing systems for improving the efficiency of the operation of determining the location of that block in the data repository.

Since the data files to be backed up are divided into data blocks, the process of comparing each data block to data blocks that already are stored can be distributed across a plurality of data processing systems. Thus, rather than the data block comparisons being implemented sequentially by a single data processing system, multiple data processing systems can perform the comparisons in parallel. This reduces the amount of time it takes to perform the backup process, thus improving backup performance.

Moreover, the present arrangements provide a scalable design that provides for backup systems to be scaled as needed for growing data backup requirements. Accordingly, rather than replacing existing data backup systems, additional storage capacity can be added to complement the existing data backup systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
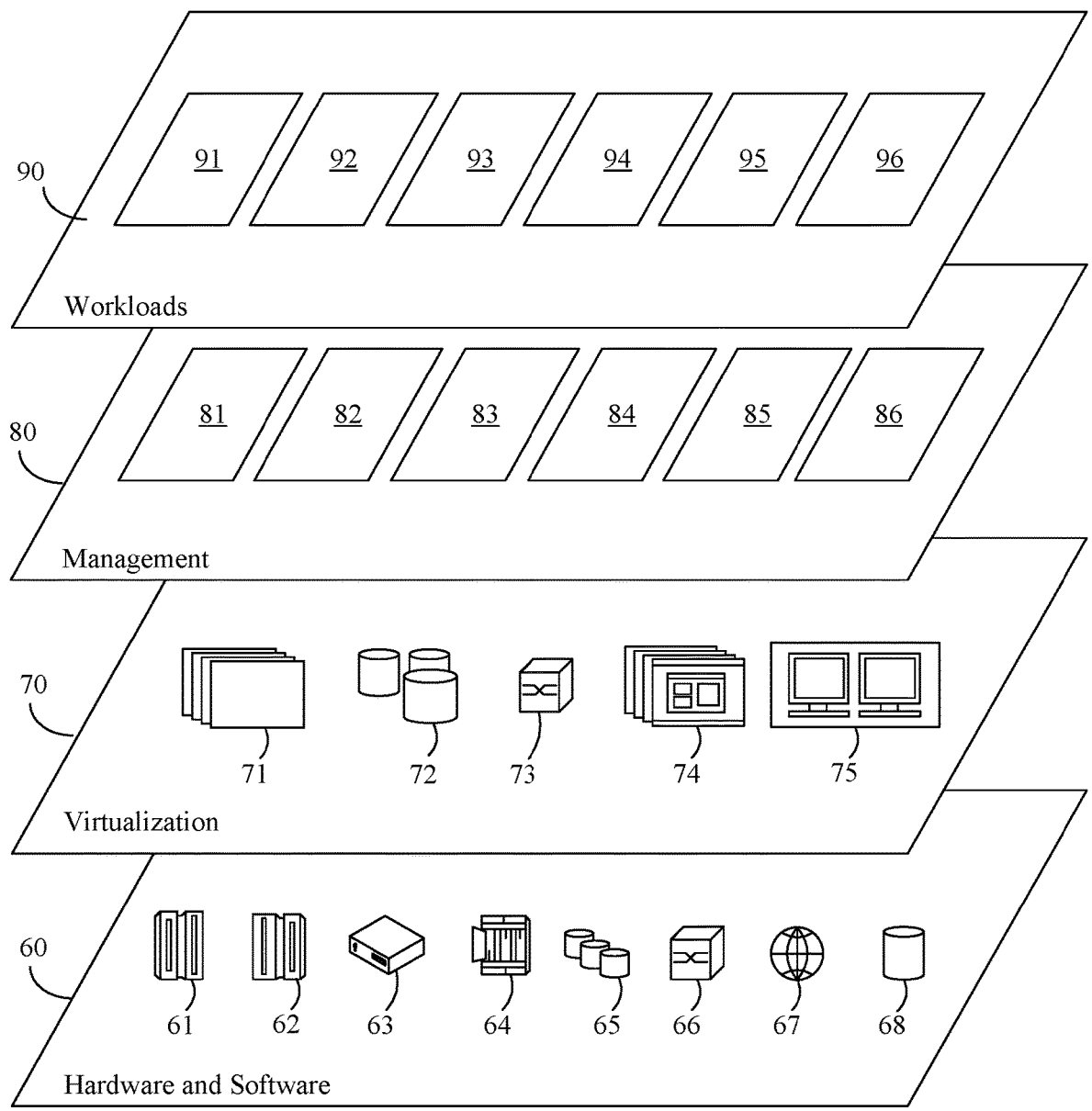
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Data backup management 86 provides management of data backups using the hardware and software layer 60.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95; and hosted computing 96.

Figure 3:
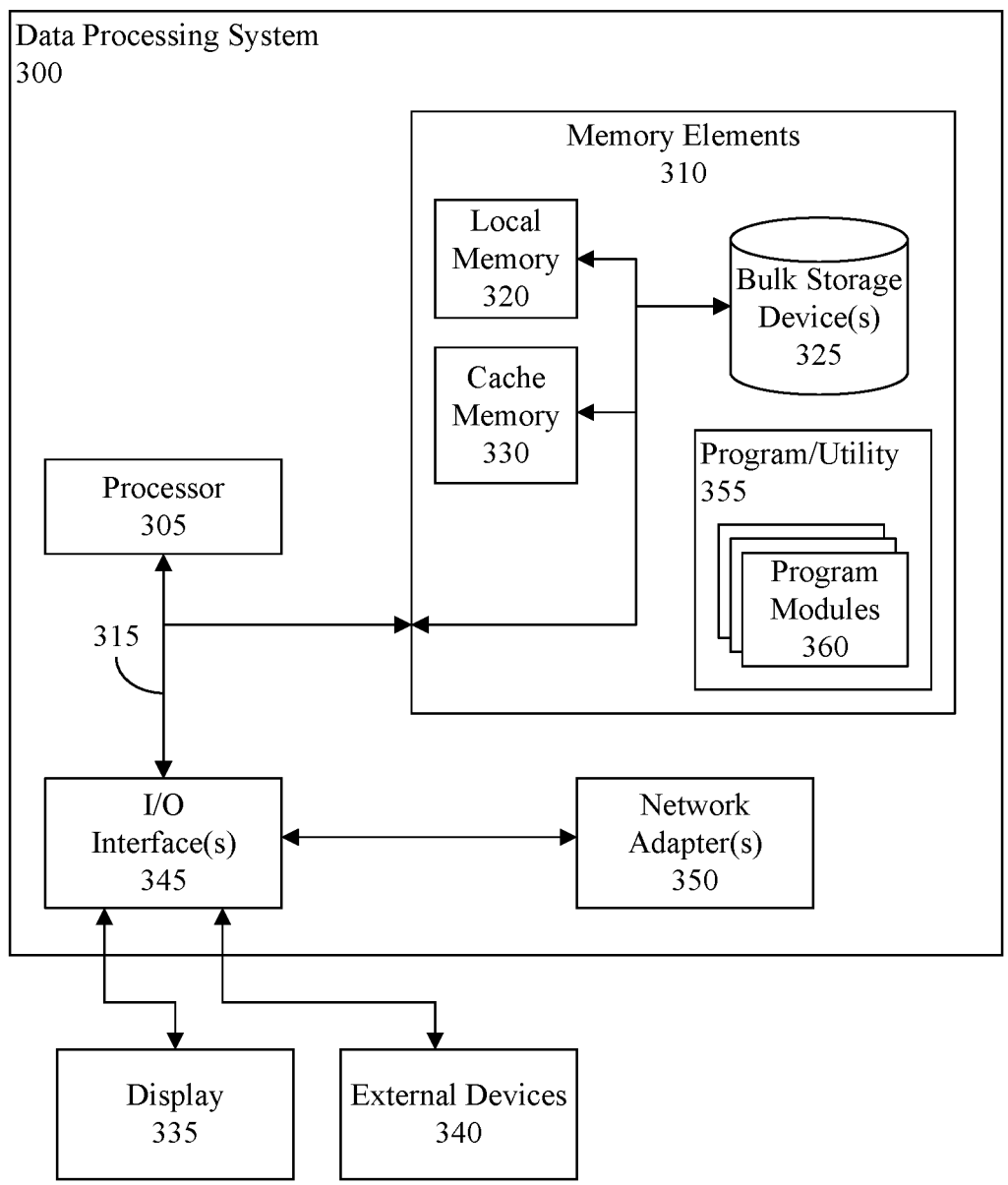
FIG. 3 is a block diagram illustrating example architecture for a processing system.

FIG. 3 depicts a block diagram of a data processing system 300 configured to perform at least one data file backup operation in accordance with an arrangement disclosed within this specification. The data processing system can be a component of the hardware and software layer 60.

The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories 330 that provide temporary storage of at least some program code in order to reduce the number of times program code must be retrieved from the local memory 320 and/or bulk storage device 325 during execution.

Input/output (I/O) devices such as a display 335 and other external devices 340 can be coupled to the data processing system 300. The I/O devices can be coupled to the data processing system 300 either directly or through intervening I/O interfaces 345. One or more network adapters 350 also can be coupled to data processing system 300, for example via the I/O interface(s) 345, to enable the data processing system 300 to become coupled to other systems, computer systems, remote printers, and/or remote storage devices through intervening private or public networks. Modems, cable modems, transceivers, and Ethernet cards are examples of different types of network adapters 350 that can be used with the data processing system 300.

As pictured in FIG. 3, the memory elements 310 can store the components of the data processing system 300, namely the programs and/or utilities 355 comprising one or more program modules 360. Being implemented in the form of executable program code, these components of the data processing system 300 can be executed by the data processing system 300 and, as such, can be considered part of the data processing system 300. Moreover, the programs and/or utilities 355 are functional data structures that impart functionality when employed as part of the data processing system 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Figure 4:
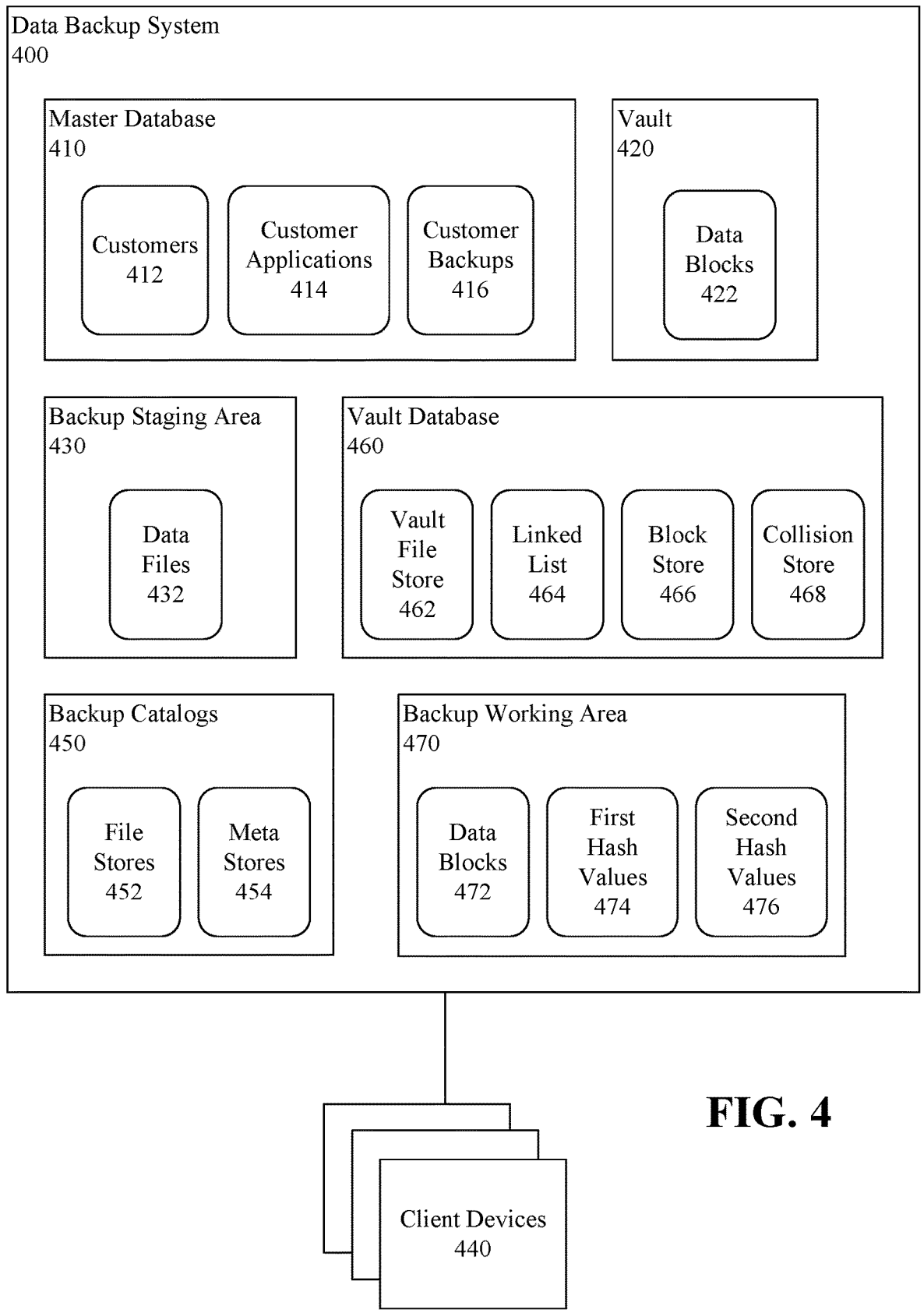
FIG. 4 is a block diagram illustrating example architecture for a data backup system.

FIG. 4 is a block diagram illustrating example architecture for a data backup system 400. The data backup system 400 can be implemented, for example, at the management layer 80, for example as data backup management 86. One or more data processing systems, including the data processing system 300, can execute one or more programs/utilities 355 to implement the data backup system 400.

The data backup system 400 can include a master database 410. The master database 410 can include various data stores (e.g., data tables) configured to store data pertaining to customer's and their data backups. For example, the master database can include data stores for customers 412, customer applications 414 and customer backups 416. For each customer, the customers 412 data store can be configured to store a customer identifier and a customer name. The customer applications 414 data store can be configured to store information pertaining to applications for which data is backed up, information pertaining to relationships between servers/nodes for each application, information indicating whether applications are production or non-production, information pertaining to virtual machines hosting the applications, node identifiers, operating system information, etc. The customer backups 416 data store can keep records of data backups performed for customers, including links between customer backups 416 records and customer applications 414 included in the backups.

The data backup system 400 also can include a vault 420 configured to store data blocks 422. As will be described, data files to be backed up can be divided into data blocks of a specified size, for example 1 kB, 2 kB, 4 kB, 6 kB, 8 kB, etc., and each data block can be stored to the vault 420 if another data block 422 having the same data is not already stored in the vault 420.

The data backup system 400 also can include a backup staging area 430. The backup staging area 430 can be, for example, implemented on a secure data storage system assigned to host the backup staging area 430. The backup staging area 430 can be, for example, implemented using the Hadoop Distributed File System (HDFS). Responsive to data files 432 being uploaded from client devices 440 for backup, the data backup system 400 can temporarily store the data files 432 in the backup staging area 430. For example, the data backup system 400 can create a directory in the backup staging area 430 in which the data files 432 are stored. In response to the backup of the data files 432 being completed, those data files 432 can be deleted from the backup staging area 430. For example, the data backup system 400 can delete the directory containing the data files 432.

The data backup system 400 also can include backup catalogs 450. A new backup catalog 450 can be created for each file backup job and can be deleted in response to the backup of the data files for that backup job being completed. Each backup catalog 450 can be identified using a Client identifier, a Node identifier and a Backup start time stamp. Each backup catalog 450 can include a respective file store 452 and a respective meta store 454, each of which can be implemented as a data table or other suitable data file.

The file store 452 can act as a backup catalog for a particular backup job, and can be configured to store the following attributes of files which are part of a given backup for which it is created:
Unique identifier of backup record
File identifier
File name
File operating system path
File staging path
File size
File hash value
File permissions
File owner
File group owner
File creation date
File modification date
File access date The file identifier can be, for example, a unique identifier of a data file, for example a hash value of the <Client identifier_node identifier_Backup start time stamp>/Absolute file path.

The backup meta store 454 can be configured to store the following attributes of the backup job itself for which it is created:
Client identifier
Node identifier
Backup time stamp
Directory name in staging
Size of directory bytes
File count
Unique identifier of backup record
File upload completed The "File upload completed" can be, for example, "Y" for yes and "N" for no.

The data backup system 400 also can include a vault database 460 configured to store information pertaining to data blocks 422 stored in the vault 420. The vault database 460 can be implemented using the RDFS. The vault database 460 can include a vault file store 462, a linked list 464, a block store 466 and a collision store 468.

The vault file store 462 can be configured to store the following attributes for the vault 420:
Unique identifier of each backup record
Node identifier
File identifier
File name
File operating system path
File staging path
File size
File hash value
File permissions
File owner
File group owner
File creation date
File modification date
File access date
File type
File synthesis status The linked list 464 can be configured to store the following attributes for the vault 420:
Unique identifier of each backup record
File hash values
File identifier
Block order
Block locations The block store 466 can be configured to store the following attributes for the vault 420:
Block location
Block first hash values
Block size The collision store 468 can be configured to store the following attributes for the vault 420:
Block location
Block first hash values
Block second hash values
Block size The data backup system 400 also can include a backup working area 470. The backup working area 470 can be, for example, implemented on memory elements 310 of the data processing system 300, on an external data storage device/system, or on memory elements of another data processing system to which the data processing system 300 is communicatively linked. The backup working area 470 can be, for example, implemented using the HDFS. The backup working area 470 can be used by the data backup system 400 to store, at least temporarily, data blocks 472 of data files 432 being backed up. The backup working area 470 also can be used by the data backup system 400 to store, at least temporarily, first hash values 474 and second hash values 476 for the data blocks 472 generated during the backup process, which will be described herein.

Figure 5:
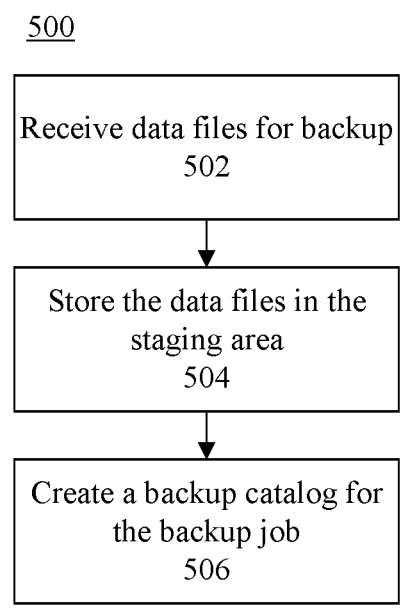
FIG. 5 is a flowchart illustrating an example of a method of preparing data files for backup.

FIG. 5 is a flowchart illustrating an example of a method 500 of preparing data files for backup. The method 500 can be implemented automatically by a data processing system, for example the data processing system 300 of FIG. 3, in real time.

At step 502, the data processing system 300 can receive data files 432 for backup. The data files 432 can be received, for example, from a client device 440. At step 504, the data processing system 300 can store the data files 432 in the backup staging area 430. At step 506, the data processing system 300 can create a backup catalog 450 for the backup job. The data processing system 300 can create, in the backup catalog 450, a file store 452 and a meta store 454, and populate the file store 452 and the meta store 454 with data pertaining to the backup job. For example, the data processing system 300 can add to the file store 452 and the meta store 454 data corresponding to the previously described attributes for the file store 452 and the meta store 454, respectively.

Figure 6A:
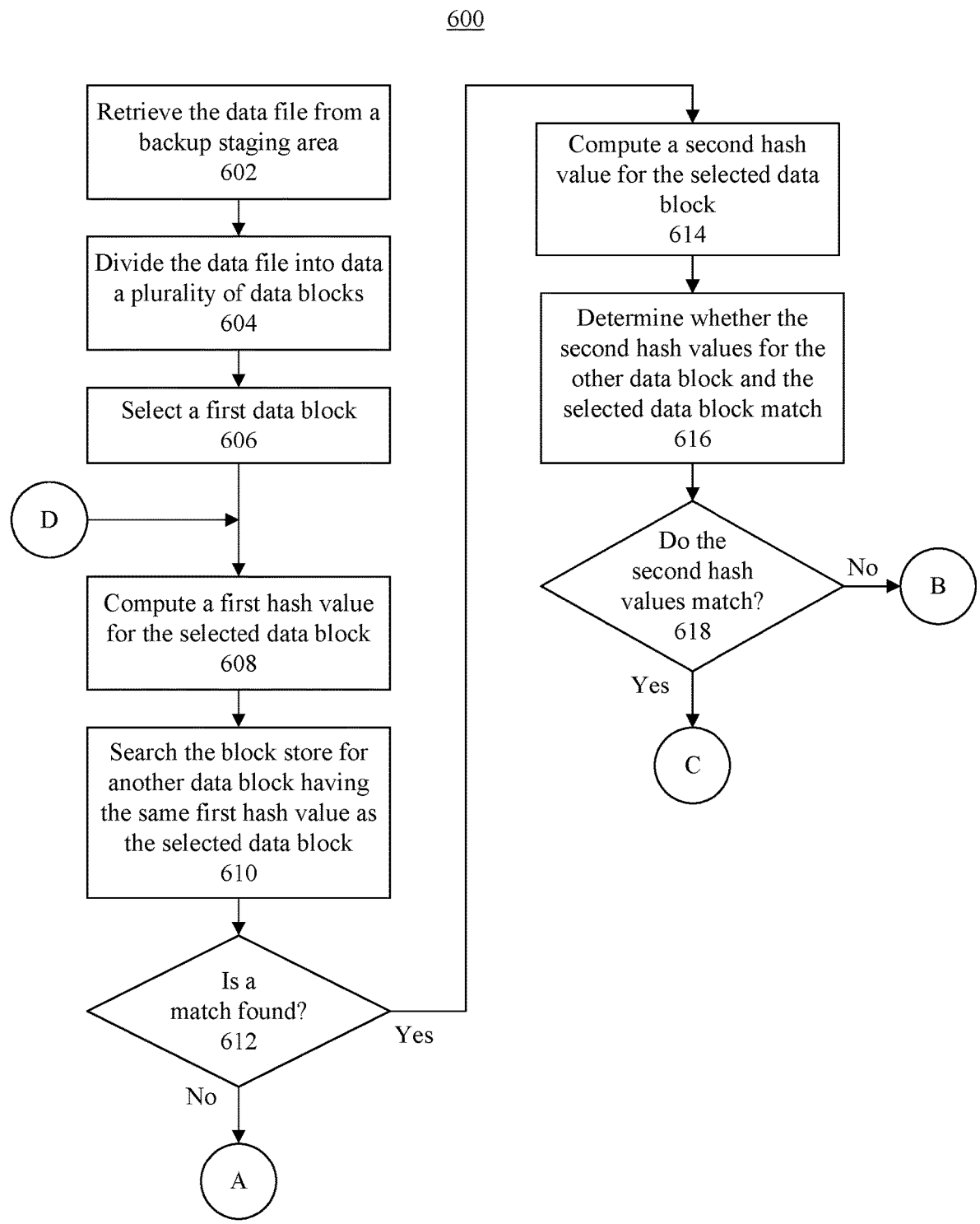
FIGS. 6A, 6B and 6C, together, are a flowchart illustrating an example of a method of backing up data files.
Figure 6B:
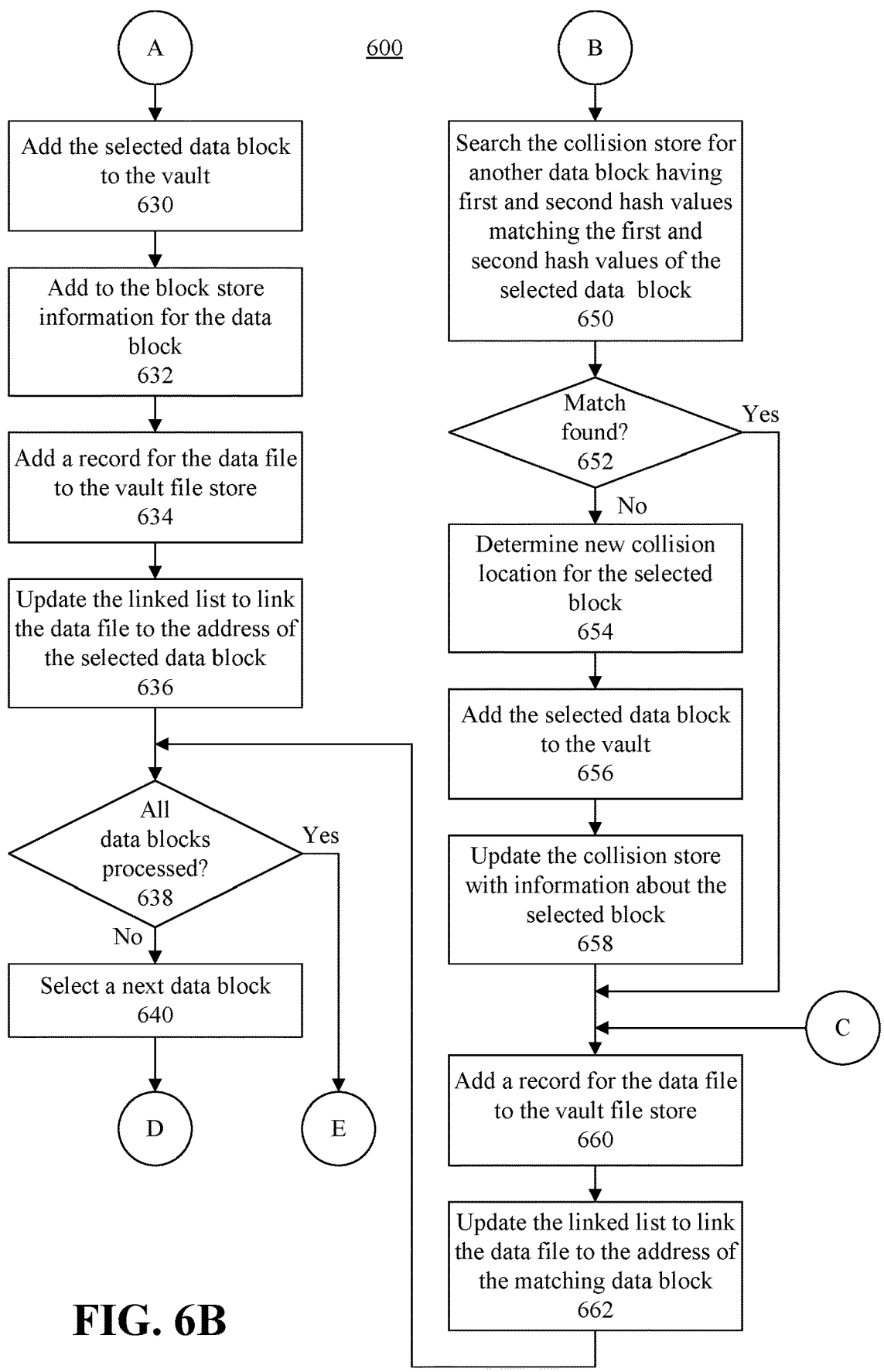
Figure 6C:
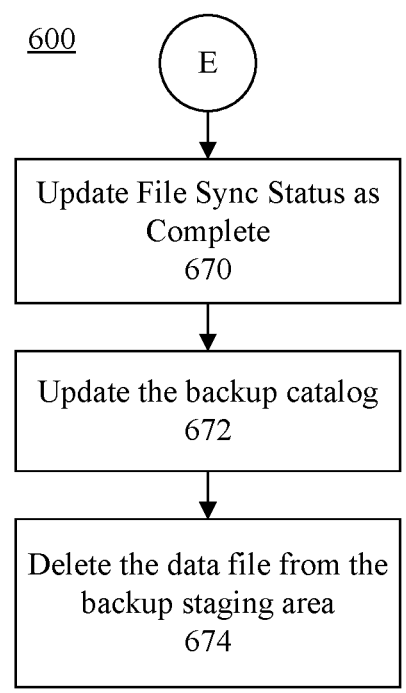

FIGS. 6A, 6B and 6C, together, are a flowchart illustrating an example of a method 600 of backing up data files. The method 600 can be implemented automatically by a data processing system, for example the data processing system 300 of FIG. 3, in real time. Other similarly configured data processing systems also can participate in implementing the method 600. Thus, the workload for performing the backup of the data files can be distributed across a plurality of data processing systems. Accordingly, a plurality of data processing systems can participate in backing up one or more data files 432 while implementing the processes described in FIGS. 6A, 6B and 6C to prevent duplication of data blocks 422 in the vault 420, even though the vault 420 may be used to store data blocks 422 for multiple customers and from multiple client devices 440.

Referring to FIG. 6A, at step 602 the data processing system 300 can retrieve a data file 432 from the backup staging area 430. At step 604 the data processing system 300 can divide the data file 432 into a plurality data blocks 472. For example, the data processing system 300 can divide the data file 432 into data blocks 472 having a specified size. The specified size can be, for example, 1 kB, 2 kB, 4 kB, 6 kB, 8 kB, etc. Accordingly, all the data blocks 472, except the last residual block can be the same size. Irrespective of the size of the last block 472, a hash value can be calculated for each the data blocks 472, as explained in 608.

At step 606 the data processing system 300 can select a first data block 472. At step 608 the data processing system 300 can compute a first hash value 474 for the selected data block 472. For example, the data processing system 300 can compute the first hash value 474 using a first hash algorithm. The first hash algorithm can be, for example, a secure hash algorithm (SHA), such as SHA-2. SHA-512256 is an example of SHA-2 that may be used. Nonetheless, the present arrangements are not limited in this regard and any other suitable hash algorithm may be used.

At this point it should be noted that the data blocks 472 need not be processed sequentially. Instead, a plurality of data blocks 472 can be processed in parallel. In illustration, while processing of the selected data block 472 continues in method 600, additional data blocks 472 can be selected and processed, in accordance with method 600, in parallel to processing of the first data block 472. For example, the first data block 472 can be processed in a first thread of a processor, a second data block 472 can be processed in a second thread of the processor, and so on. Moreover, the data backup system 400 can be horizontally scalable. Data blocks 472 can be processed by one or more other data processing systems. In this regard, the data processing system 300 can be configured to allocate data blocks 472 to various threads and/or various data processing systems for backup processing. The data processing system 300 can maintain, for example in local memory 320 or cache memory 330, a data structure (not shown) that tracks such allocations.

At step 610 the data processing system 300 can search the block store 466 for another data block 422 having the same first hash value 474 as the selected data block 472. In this regard, the block store 466 can store first hash values for each of the data blocks 422 stored in the vault 420, and store the location (e.g., address) of each of the data blocks 422 stored in the vault 420. The data blocks 422 can be data blocks that were stored to the vault 420 during backup operations performed on other client devices. The data processing system 300 can compare the first hash value 474 of the selected data block 472 to first hash values stored in the block store 466 to determine whether any of the data blocks 422 have a first hash value matching the first hash value 474 of the selected data block 472. The data processing system 300 can perform the comparison, for example, in accordance with method 700 of FIG. 7, which will be described.

At decision box 612 the data processing system 300 can determine whether a match to the first hash value 474 of the selected data block 472 is found in the block store 466. If not, the process can proceed to step 630 of FIG. 6B. If another data block 422 is found having a first hash value matching the first hash value 474 of the selected data block 472, the process can proceed to step 614. The data file 432, from which the selected data block 472 is parsed, can be received from a first client device 440, and the other data block 422 may previously have been stored to the vault 420 during a backup performed on another file received from a second client device 440.

Even if another data block 422 is found that has a first hash value matching the first hash value 474 of the selected data block 472, there is a possibility that the other data block 422 does not contain the same data as the selected data block 472. There is some level of probability, albeit very low, that the same hash value can be computed for differing sets of data. Accordingly, the present arrangements can implement additional steps, using a second hash algorithm, to verify whether a valid match to the selected data block 472 is found in the vault 420.

At step 614 the data processing system 300 can compute a second hash value 476 for the selected data block 472. The second hash value 476 can be computed using a second hash algorithm that is different than the first hash algorithm used to compute the first hash value 474. The second hash algorithm can be, for example, a cryptographic hash algorithm, for example an algorithm that implements a Tiger hash function. The present arrangements are not limited in this regard and any other suitable hash algorithm that is different than the first hash algorithm may be used.

At step 616 the data processing system 300 can determine whether the second hash value 476 of the selected data block 472 matches a second hash value of the other data block 422 found to have a first hash value matching the first hash value 474 of the selected data block 472. By way of example, the data processing system 300 can obtain the second hash value for other data block 422 from the block store 466. In another example, the data processing system 300 can access the other data block 422 from the vault 420, using the address for the other data block 422 indicated in the block store 466, and compute the second hash value for the other data block 422. Again, the data processing system 300 can perform the comparison, for example, in accordance with method 700 of FIG. 7, which will be described.

In one or more arrangements, one or more of steps 614 and 616 can be performed by a data processing system different than the data processing system that performed step 608 and/or 610. Moreover, one or more of steps 608 and 610 can be performed by a data processing system different than the data processing system 300 that performed steps 602, 604. For example, computationally it may be more efficient to have certain data processing systems specifically configured to compute certain hash algorithms. In this regard, the hash algorithms can stay in cache memory, and thus remain available for computing hash values for data blocks extremely quick.

At decision box 618 the data processing system 300 can determine whether the second hash value of the other data block 422 matches the second hash value 476 of the selected data block 472. If not, the process can proceed to step 650 of FIG. 6B. If the second hash value of the other data block 422 matches the second hash value 476 of the selected data block 472, the process can proceed to step 660 of FIG. 6B.

Reference now is made to FIG. 6B. Step 630 continues from decision box 612 if a match to the first hash value 474 of the selected data block 472 was not found in the block store 466. At step 630 the data processing system 300 can add the selected data block 472 to the vault 420 as a data block 422. The first hash value 474 of the selected block 472 can be used to determine the location in the vault 420 where the selected block 472 is stored as a data block 422, for example as described with respect to FIG. 7.

At step 632 the data processing system 300 can add to the block store 466 information for the selected data block 472. The information can include, for example, the address of the selected data block 472 in the vault 420, the first hash value 474 for the selected data block 472, the size of the selected data block 472, and/or any other pertinent information.

At step 634 the data processing system 300 can add a record for the data file 432 to the vault file store 462. For example, data from the meta store 454 for the data file 432 can be copied to the record added to the vault file store 462 for the data file 432. Further, the file synthesis status for the record can be set to indicate that file synthesis status is incomplete. File synthesis status "incomplete" can be used to indicate that one or more data blocks 472 from the data file 432 are still pending. When the last block is processed the file synthesis status can be marked as "complete."

At step 636 the data processing system 300 can update the linked list 646 to link the data file 432 with the selected data block 472 at its location in the vault 420. For example, the linked list 646 can be updated to create a record indicating the data file 432 and the address in the vault 420 where the data block 472 is added to the vault 420 as a data block 422.

At decision box 638 the data processing system 300 can determine whether all of the data blocks 472 for the data file 432 have been processed. If not, at step 640 the data processing system 300 can select a next data block 472, and the process can return to 608 of FIG. 6A and continue until all of the data blocks 472 for the data file 432 have been processed. If, however, all the data blocks 472 for the data file 432 have been processed, the process can proceed to step 670 of FIG. 6C.

Step 650 continues from decision box 618 of FIG. 6A if the second hash value of the other data block 422 does not match the second hash value 476 of the selected data block 472. At step 650 the data processing system 300 can search the collision store 468 for another data block 422 having a first hash value matching the first hash value 474 of the selected data block 472 and having a second hash value matching the second hash value 476 of the selected data block 472.

At decision box 652 the data processing system 300 can determine whether a match is found. If not, at step 654 the data processing system 300 can determine a new, alternate, location where the selected data block 472 can be placed in the vault 420. The new location can indicate that the selected data block 472 was subject to a collision, meaning that the first hash value 474 for the selected data block 472 matches a first hash value for another data block 422, but the second hash value 476 for the selected data block 472 does not match the second hash value of the other data block 422.

At step 656 the data processing system 300 can store the selected data block 472 in the vault 420 as a data block 422 using the alternate location indicating that a collision has been identified for the selected data block 472.

At step 658 the data processing system 300 can update the collision store 468 with the first hash value 474 and the second hash value 476 of the selected data block 472, and the size of the selected data block 472. The process can proceed from step 658 to step 660.

If at decision box 652 a match to the selected data block 472 is found in the collision store 468, the process can proceed to step 660. The process also can proceed to step 660 from decision box 618 of FIG. 6A if the second hash value of the other data block 422 matches the second hash value 476 of the selected data block 472.

At step 660 the data processing system 300 can add a record for the data file 432 to the vault file store 462. At step 662 the data processing system 300 can update the linked list 646 to link the data file 432 to the other data block 422 found to match the selected data block 472 at decision box 618 or decision box 652. For example, the linked list 646 can be updated to create a record indicating the data file 432 and the address of the other data block 422 in the vault 420.

In this regard, because the other data block 422 has the same first and second hash values as the selected data block 472, indicating that data block 422 contains the same data as the selected data block 472. Thus, rather than storing the data block 472, the other data block 422 can be associated with the data file 432, even though the other data block 422 also is associated with one or more other data files for which previous backup operations were performed. Those other data files may have been received from other client devices 440 and may belong to entirely different customers. Nonetheless, by associating that other data block 422 with multiple data files 432, data redundancy in the data backup system 400 is reduced, conserving valuable data storage space.

From step 662 the process can proceed to decision box 638 and continue until all of the data blocks 472 for the data file 432 have been processed. As noted, the data processing system 300 can select a next data file, and repeat the method 600 until all of the data files 432 received from the client device 440 have been processed to complete the backup process.

Reference now is made to FIG. 6C. Step 670 continues from decision box 638 after all data blocks 472 in the data file 432 have been processed according to the steps of FIGS. 6A and 6B. At step 670 the data processing system 300 can update a File synthesis status for the data file 432 in the vault file store 462 to indicate that backup of the data file 432 is complete.

At step 672 the data processing system 300 can update the backup catalog 450. For example, the backup catalog 450 can be updated to change the location of the data file 432 from the backup staging area 430 to a value of "null," meaning that the data file 432 is available to be searched in the vault database 460 using a unique identifier for the data file 432. The unique identifier can be, for example, <Client identifier_node identifier_Backup start time stamp>/Absolute file path. At step 674 the data processing system 300 can delete the data file 432 from the backup staging area 430.

The data processing system 300 can select a next data file 432 and repeat the method 600 until all of the data files 432 received from the client device 440 have been processed to complete the backup process. In one or more arrangements, different ones of the data files 432 can be allocated to different data processing systems for processing in accordance with the method 600. Accordingly, the data files 432 can be backed up in parallel. The data processing system 300 can maintain, for example in local memory 320 or cache memory 330, a data structure (not shown) that tracks such allocations.

Figure 7A:
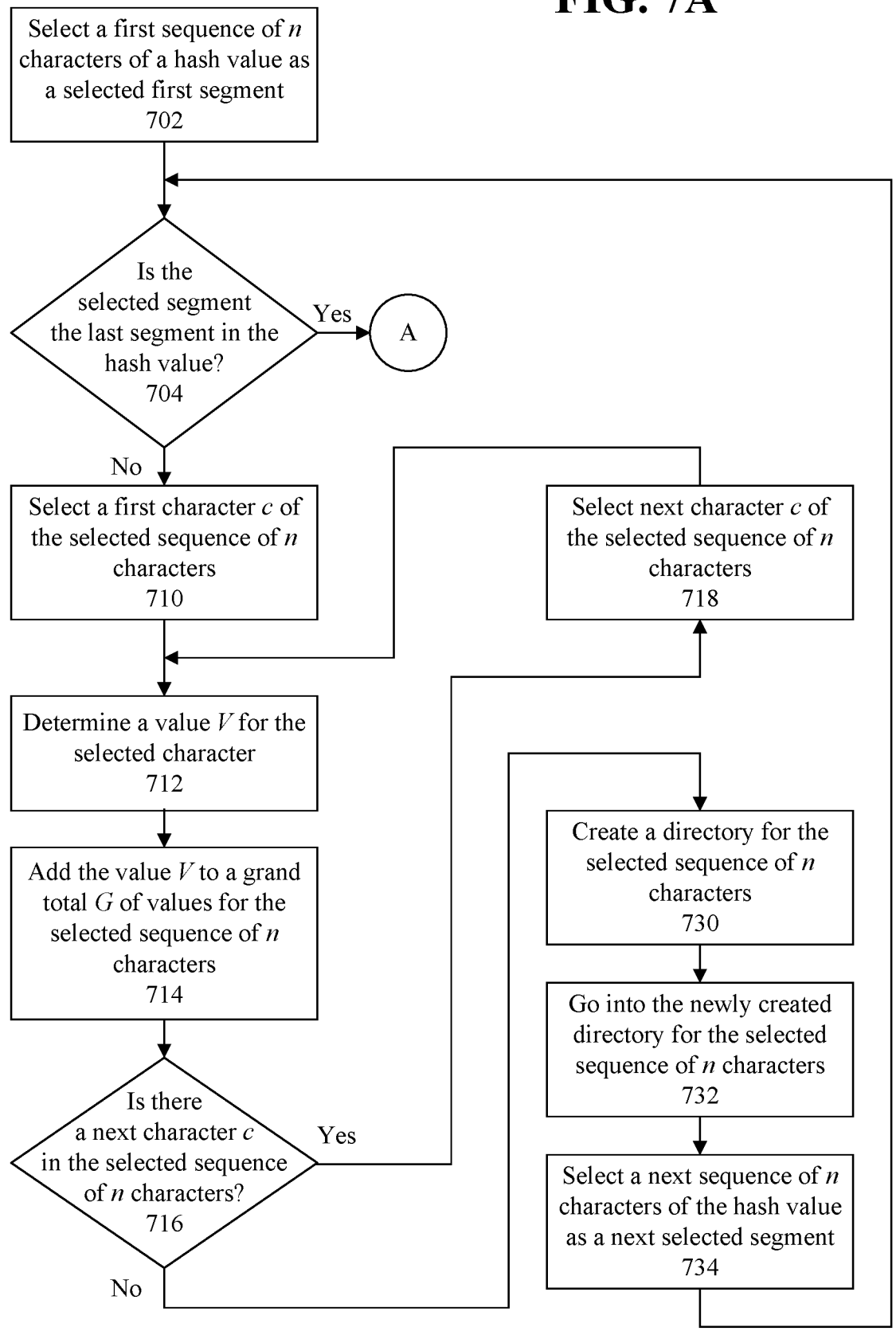
FIGS. 7A and 7B, together, are a flowchart illustrating an example of a method of mapping a data block to a location in a vault.
Figure 7B:
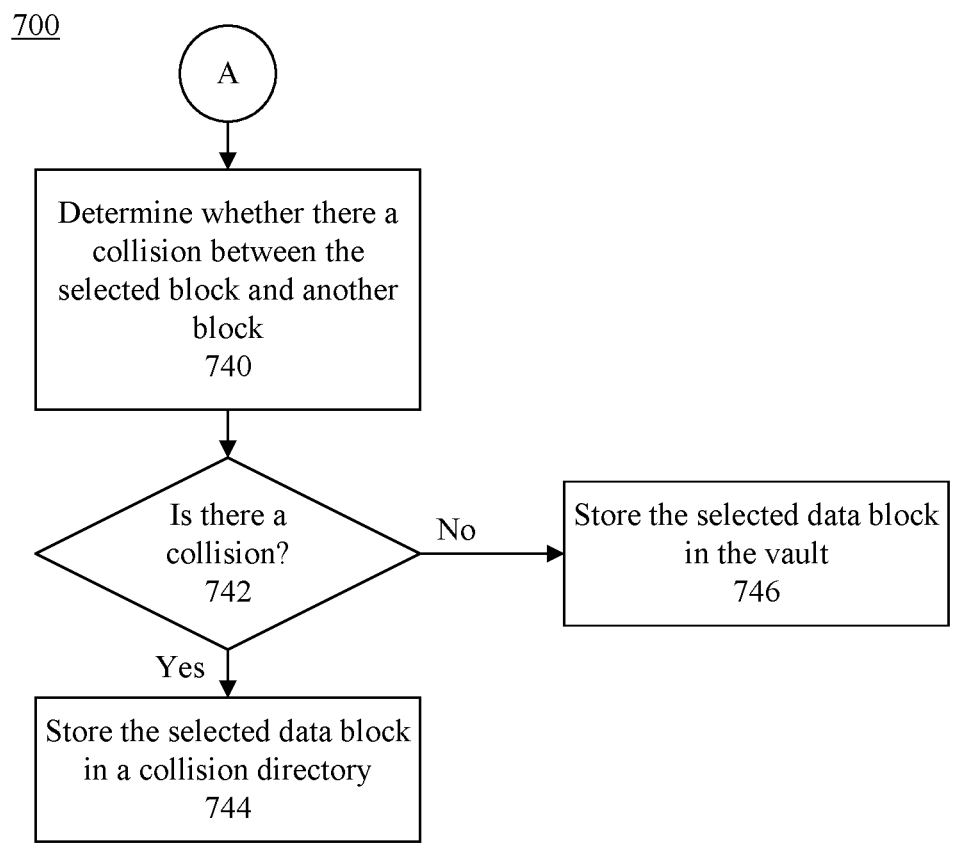

FIGS. 7A and 7B, together, are a flowchart illustrating an example of a method 700 of mapping the selected data block 472 to a location in the vault 420. The location can be specific to the selected data block 472. The method 700 can be implemented automatically by a data processing system, for example the data processing system 300 of FIG. 3 or another data processing system, in real time. Other similarly configured data processing systems also can participate in implementing the method 700.

Referring to FIG. 7A, at step 702, the data processing system 300 can select, as a first selected segment, a first sequence of n characters of the first hash value 474 for the selected data block 472. The value n can be any specified integer that is not greater than one-half of the total number of characters contained in the hash value. For example, n can be a multiplicand that, when multiplied by a multiplier that is an integer at least equal to two, produces a product equal to the total number of characters contained in the hash value. In illustration, if the hash value has 64 characters, n can be 2, 4, 8, 16 or 32. By way of example, assume the value of n is specified to be 8 and the hash value has 64 characters. In this example, since 64/8=8, the hash value can have 8 segments, each segment having a sequence of 8 characters.

At decision box 704 the data processing system 300 can determine whether the selected segment is the last segment of the first hash value 474 of the selected data block 472. If not, at step 710 the data processing system 300 can select a first character c of the selected sequence of n characters. At step 712 the data processing system can determine a value V for the selected character. The value V can be determined to be a product of x and P (i.e., V=x*P), where x is the ASCII value of the selected character c, and P is the position of the selected character c in the selected sequence of n characters. For example, if for the first character in the selected sequence of n characters the value P can be 1, for the second character in the selected sequence of n characters the value P can be 2, for the third character in the selected sequence of n characters the value P can be 3, and so on.

At step 714 the data processing system 300 can add the value V to a grand total G of values for the selected sequence of n characters (i.e., G=G+V). Initially, prior to any values V being added to the grand total G, the grand total G can be set to zero. Thus, the grand total G can be a running total, increasing as each successive value of V is added to the grand total G as steps 712, 714 and 718 are recursively performed. By way of example, assuming the first hash value 474 is 64-bits and is parsed into eight segments, each segment having eight characters, the value of the grand total G can be a number in a range from 1728 through 4392. In illustration, if a given segment has all 8 characters as 0 (i.e., 00000000) then taking the ASCII value of 0 as 48 the GrandTotal (G)=48*1+48*2+48*3+48*4+48*5+48*6+48*7+48*8=1728. Similarly, if a given segment has all 8 characters as z (i.e., zzzzzzzz) then taking the ASCII value of z as 122 the GrandTotal (G)=122*1+122*2+122*3+122*4+122*5+122*6+122*7+122*8=4392.

At decision box 716, the data processing system 300 can determine whether there is a next character c in the selected sequence of n characters. If so, at step 718 the data processing system 300 can select a next character c in the selected sequence of n characters. The next character c that is selected can be the character immediately following the previously selected character in the selected sequence of n characters. The process can return to step 712 and steps 712 and 714 can be recursively performed until each respective value V determined for each respective character c in the sequence of n characters has been added to the grand total G.

Referring again to decision box 716, if there is not a next character c in the selected sequence of n characters that has not already been selected for processing at steps 712 and 714, the process can proceed to step 730. At step 730 the data processing system 300 can create a directory for the selected segment. That directory can be assigned a name that is the value of the grand total G. At step 732 the data processing system 300 can enter into the newly created directory the selected segment.

At step 734 the data processing system can select a next sequence of n characters of the hash value as a next selected segment. The next sequence of n characters that is selected can be the sequence of n characters immediately following the previously selected sequence of n characters. The process then return to step 710, and steps/decision boxes 710-734 can be performed recursively until a determination is made at decision box 704 that the selected segment is the last segment of the first hash value 474. Responsive to the data processing system 300 determining that the selected segment is the last segment of the first hash value 474, the process can proceed to step 740 of FIG. 7B.

In this regard, the directory created for the first segment (i.e., the first sequence of n characters) of the first hash value 474 can be a parent directory for a nested directory structure. As the process described for the method 700 recursively iterates, successive child directories can be recursively nested within the parent directory, and the names assigned to those child directories can be the grand total G determined for the respective segments for which the child directories are created. The parent directory can be initially stored in the backup working area 470, or stored in the vault 420.

In illustration, assume the first hash value 474 is as follows:

2e41be04c33740ee249a041fb6765b24ca7eae1fa81ae50b6cba2ee8e3bc832a

The hash value can be divided into the following segments:
segment-1: 2e41be04
segment-2: c33740ee
segment-3: 249a041f
segment-4: b6765b24
segment-5: ca7eae1f
segment-6: a81ae50b
segment-7: 6cba2ee8
segment-8: e3bc832a Each of the segments from the first segment through the penultimate segment can be assigned a value for the grand total G determined for that segment as follows:

| | |
|---|---|
| segment-1: 2e41be04 | : G = ValueG1 |
| segment-2: c33740ee | : G = ValueG2 |
| segment-3: 249a041f | : G = ValueG3 |
| segment-4: b6765b24 | : G = ValueG4 |
| segment-5: ca7eae1f | : G = ValueG5 |
| segment-6: a81ae50b | : G = ValueG6 |
| segment-7: 6cba2ee8 | : G = ValueG7 |

In this example, each of the values ValueG1-ValueG7 for the grand totals G can be a number in a range from 1728 through 4392, depending on the grand total G determined for each respective segment.

The nested directory structure can be created using the values of G for first segment through the penultimate segment, with each directory named a corresponding value of G. For example, the parent directory can be named as the number represented by ValueG1. Inside the parent directory a second directory can be created and named as the number represented by ValueG2. Inside the second directory a third directory can be created and named as the number represented by ValueG3, and so on through all of the segments except for the last segment. Accordingly, the nested directory structure created for the selected first hash value 474 can be as follows:

ValueG1\ValueG2\ValueG3\ValueG4\ValueG5\
        ValueG6\ValueG7

Referring to FIG. 7B, at step 740 the data processing system 300 can determine whether there is a collision between the selected block 472 and another data block 422. As noted, a collision is a circumstance in which the first hash value 474 for the selected data block 472 matches a first hash value for another data block 422, but the second hash value 476 for the selected data block 472 does not match the second hash value of the other data block 422.

If there is a collision between the selected block 472 and another data block 422, at step 744 the data processing system 300 can store the selected block 472 in a collision directory. In illustration, the data processing system 300 can assign a name to the selected block 472. The name can be the last sequence of n characters of the first hash value 474 of the selected block 472. The selected block 472 can be stored inside the nested directory structure, and the nested directory structure can be stored in the collision directory in the vault 420. Continuing with the previous example, assume that the collision directory is assigned the name "collision." Thus, the location of the selected block 472 in the vault 420 can be as follows:

ValueG1\ValueG2\ValueG3\ValueG4\ValueG5\
        ValueG6\ValueG7\collision\e3bc832a The data processing system 300 can store the selected data block 472 in the nested directory structure under the collision directory. In this regard, if the nested directory structure initially is stored in the backup working area 470, the data processing system 300 can move the nested directory structure to the collision directory.

Referring again to decision box 742, if there is not a collision between the selected block 472 and another data block 422, at step 746 the data processing system 300 can store the selected block 472 in the vault 420 as a data block 422. In illustration, the data processing system 300 can assign a name the selected block 472. Again, the name can be the last sequence of n characters of the first hash value 474 of the selected block 472. The selected block 472 can be stored inside the nested directory structure, and the nested directory structure can be stored in the vault 420. Continuing with the previous example, the location of the selected block 472 in the vault 420 can be as follows:

ValueG1\ValueG2\ValueG3\ValueG4\ValueG5\
        ValueG6\ValueG7\e3bc832a

If the nested directory structure initially is stored in the backup working area 470, the data processing system 300 can move the nested directory structure to the vault 420.

Figure 8:
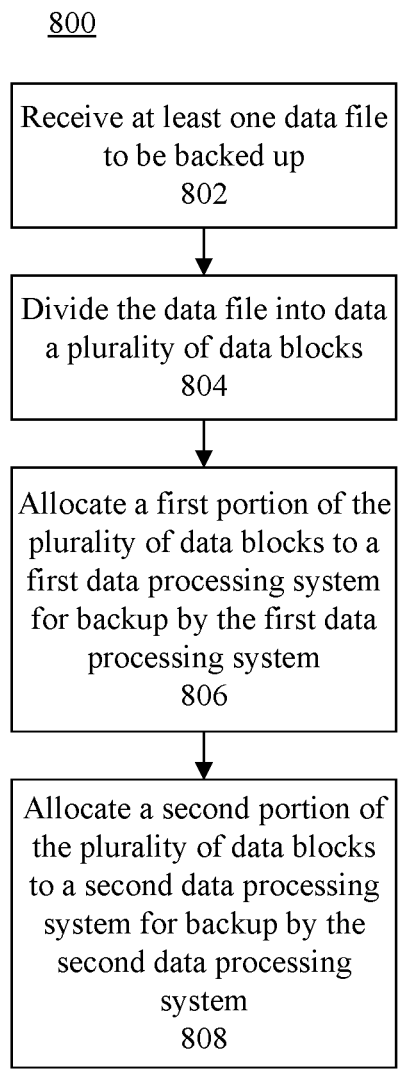
FIG. 8 is a flowchart illustrating an example of a method of backing up data files.

FIG. 8 is a flowchart illustrating an example of a method 800 of backing up data files. The method 700 can be implemented automatically by a data processing system, for example the data processing system 300 of FIG. 3, in real time.

At step 802 the data processing system 300 can receive at least one data file 432 to be backed up. At step 804 the data processing system 300 can divide the data file 432 into a plurality of data blocks 472. At step 806 the data processing system 300 can allocate a first portion of the plurality of data blocks to a first data processing system for backup by the first data processing system. The first data processing system can be the data processing system 300 or another data processing system. At step 808 the data processing system 300 can allocate a second portion of the plurality of data blocks to a second data processing system for backup by the second data processing system.

For example, the first data processing system can perform steps and decision boxes 608-618, 630-636 and 650-662 of FIGS. 6A and 6B on one or more data blocks 472 for the data file 432, and the second processing system can perform steps and decision boxes 608-618, 630-636 and 650-662 of FIGS. 6A and 6B on one or more other data blocks 472 for the data file 432, and so on. The first data processing system and the second data processing system can be components of the hardware and software layer 60.

Moreover, as noted, certain steps of FIGS. 6A and 6B can be allocated to even other data processing systems, for example as previously described.

Several definitions that apply throughout this document now will be presented.

As defined herein, the term "vault" means a data repository where data blocks are persisted. The data repository can comprise one or more data storage devices.

As defined herein, the term "data block" means a portion of a data file that is divided into a plurality of portions.

As defined herein, the term "collision" means that a first hash value computed for a first block matches a first hash value computed for a second block, but a second hash value computed for the first block does not match a second hash value computed for the second block, wherein the first hash values are computed using a first algorithm and the second hash values are computed using a second algorithm that is different than the first algorithm.

As defined herein, the term "segment" means a sequence of n characters, where n is an integer.

As defined herein, the term "backup," when used as a noun, means a copy of data stored for use in data recovery to replace the data in the event of the data being lost or corrupted.

As defined herein, the term "backup," when used as a verb, means to store a copy of data for use in data recovery to replace the data in the event of the data being lost or corrupted.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving at least one data file for backup;
   dividing, using a processor, the data file into a plurality of data blocks;
   allocating a first portion of the plurality of data blocks to a first data processing system for backup by the first data processing system;
   allocating a second portion of the plurality of data blocks to a second data processing system for backup by the second data processing system;
   computing, by the first data processing system, a first hash value for a first data block of the plurality of data blocks;
   determining whether the first hash value for the first data block matches a first hash value for a second data block stored in a data repository; and
   responsive to determining that the first hash value for the first data block matches the first hash value for the second data block:
      computing, by a third data processing system, a second hash value for the first data block;
      determining whether the second hash value for the first data block matches a second hash value for the second data block; and
      responsive to determining that the second hash value for the first data block matches the second hash value for the second data block, linking the data file to the second data block.

2. The method of claim 1, wherein:
   the computing the first hash value for the first data block comprises computing the first hash value using a first hash algorithm; and the computing the second hash value for the first data block comprises computing the second hash value using a second hash algorithm that is different than the first hash algorithm.

3. A system, comprising:
a processor programmed to initiate executable operations comprising:
  receiving at least one data file for backup;
  dividing the data file into a plurality of data blocks;
  allocating a first portion of the plurality of data blocks to a first data processing system for backup by the first data processing system;
  allocating a second portion of the plurality of data blocks to a second data processing system for backup by the second data processing system;
  computing, by the first data processing system, a first hash value for a first data block of the plurality of data blocks;
  determining whether the first hash value for the first data block matches a first hash value for a second data block stored in a data repository; and
  responsive to determining that the first hash value for the first data block matches the first hash value for the second data block:
    computing, by a third data processing system, a second hash value for the first data block;
    determining whether the second hash value for the first data block matches a second hash value for the second data block; and
    responsive to determining that the second hash value for the first data block matches the second hash value for the second data block, linking the data file to the second data block.

4. The system of claim 3, wherein:
the computing the first hash value for the first data block comprises computing the first hash value using a first hash algorithm; and
the computing the second hash value for the first data block comprises computing the second hash value using a second hash algorithm that is different than the first hash algorithm.

5. A computer program product, comprising:
one or more computer readable storage mediums having program code stored thereon, the program code stored on the one or more computer readable storage mediums collectively executable by a data processing system to initiate operations including:
  receiving at least one data file for backup;
  dividing the data file into a plurality of data blocks;
  allocating a first portion of the plurality of data blocks to a first data processing system for backup by the first data processing system;
  allocating a second portion of the plurality of data blocks to a second data processing system for backup by the second data processing system
  computing, by the first data processing system, a first hash value for a first data block of the plurality of data blocks;
  determining whether the first hash value for the first data block matches a first hash value for a second data block stored in a data repository; and
  responsive to determining that the first hash value for the first data block matches the first hash value for the second data block:
    computing, by a third data processing system, a second hash value for the first data block;
    determining whether the second hash value for the first data block matches a second hash value for the second data block; and
    responsive to determining that the second hash value for the first data block matches the second hash value for the second data block, linking the data file to the second data block.

6. The computer program product of claim 5, wherein:
the computing the first hash value for the first data block comprises computing the first hash value using a first hash algorithm; and
the computing the second hash value for the first data block comprises computing the second hash value using a second hash algorithm that is different than the first hash algorithm.

7. A method comprising:
receiving at least one data file for backup;
dividing, using a processor, the data file into a plurality of data blocks;
computing a first hash value for a first data block of the plurality of data blocks; and
based on the first hash value for the first data block, mapping the first data block to a respective storage location using a nested directory structure, mapping the first data block to the respective storage location using the nested directory structure comprising:
  for a first of a plurality of segments of the first hash value, creating, in a storage location, a parent directory for the nested directory structure; and
  recursively, for each successive segment of the plurality of segments of the first hash value, creating a respective directory within a directory created for an immediately preceding segment of the plurality of segments.

8. The method of claim 7, further comprising:
wherein the parent directory through a penultimate directory, in the nested directory structure, that is assigned to a segment of the first hash value each are assigned a respective name that is a value of a grand total determined for a respective sequence of characters contained in the respective segment for which the directory is created.

9. The method of claim 7, further comprising:
responsive to determining a collision between the first data block and another preexisting data block, adding to the nested directory structure a collision directory as a penultimate directory in the nested directory structure.

10. A system comprising:
a processor programmed to initiate executable operations comprising:
  receiving at least one data file for backup;
  dividing, using a processor, the data file into a plurality of data blocks;
  computing a first hash value for a first data block of the plurality of data blocks; and
  based on the first hash value for the first data block, mapping the first data block to a respective storage location using a nested directory structure, mapping the first data block to the respective storage location using the nested directory structure comprising:
    for a first of a plurality of segments of the first hash value, creating, in a storage location, a parent directory for the nested directory structure; and
    recursively, for each successive segment of the plurality of segments of the first hash value, creating a respective directory within a directory created for an immediately preceding segment of the plurality of segments.

11. The system of claim 10, the executable operations further comprising:
wherein the parent directory through a penultimate directory, in the nested directory structure, that is assigned to a segment of the first hash value each are assigned a respective name that is a value of a grand total determined for a respective sequence of characters contained in the respective segment for which the directory is created.

12. The system of claim 10, the executable operations further comprising:
responsive to determining a collision between the first data block and another preexisting data block, adding to the nested directory structure a collision directory as a penultimate directory in the nested directory structure.

13. A computer program product comprising:
one or more computer readable storage mediums having program code stored thereon, the program code stored on the one or more computer readable storage mediums collectively executable by a data processing system to initiate operations including:
receiving at least one data file for backup;
dividing, using a processor, the data file into a plurality of data blocks;
computing a first hash value for a first data block of the plurality of data blocks; and
based on the first hash value for the first data block, mapping the first data block to a respective storage location using a nested directory structure, mapping the first data block to the respective storage location using the nested directory structure comprising:
for a first of a plurality of segments of the first hash value, creating, in a storage location, a parent directory for the nested directory structure; and
recursively, for each successive segment of the plurality of segments of the first hash value, creating a respective directory within a directory created for an immediately preceding segment of the plurality of segments.

14. The computer program product of claim 13, wherein the program code is executable by the data processing system to initiate operations further comprising:
wherein the parent directory through a penultimate directory, in the nested directory structure, that is assigned to a segment of the first hash value each are assigned a respective name that is a value of a grand total determined for a respective sequence of characters contained in the respective segment for which the directory is created.

15. The computer program product of claim 13, wherein the program code is executable by the data processing system to initiate operations further comprising:
responsive to determining a collision between the first data block and another preexisting data block, adding to the nested directory structure a collision directory as a penultimate directory in the nested directory structure.

* * * * *